US010487695B2

(12) United States Patent
Watkins

(10) Patent No.: US 10,487,695 B2
(45) Date of Patent: Nov. 26, 2019

(54) SYSTEM AND METHOD OF INTERFACING INTERCOOLED GAS TURBINE ENGINE WITH DISTILLATION PROCESS

(71) Applicant: General Electric Company, Schenectady, NY (US)

(72) Inventor: Richard Michael Watkins, Houston, TX (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1033 days.

(21) Appl. No.: 14/922,039

(22) Filed: Oct. 23, 2015

(65) Prior Publication Data

US 2017/0114672 A1 Apr. 27, 2017

(51) Int. Cl.
*C02F 1/16* (2006.01)
*F01K 23/10* (2006.01)
(Continued)

(52) U.S. Cl.
CPC ............. *F01K 23/10* (2013.01); *B01D 3/007* (2013.01); *B01D 3/146* (2013.01); *C02F 1/16* (2013.01);
(Continued)

(58) Field of Classification Search
CPC .......... B01D 3/007; B01D 3/146; C02F 1/16; F01K 3/4185; F01K 7/16; F01K 17/02; F01K 19/10; F02C 3/04; F02C 7/143
See application file for complete search history.

(56) References Cited

U.S. PATENT DOCUMENTS 278,694 A   6/1883  Fallows
1,620,163 A 3/1927  Milliff et al.
(Continued)

FOREIGN PATENT DOCUMENTS

CA    2488434       6/2005
CN    102762501 A   10/2012
(Continued)

*Primary Examiner* — Jonathan Miller
(74) *Attorney, Agent, or Firm* — Fletcher Yoder, P.C.

(57) ABSTRACT

A system includes a gas turbine system having a heat recovery steam generator (HRSG), a compressor, an intercooler, and a steam turbine. The HRSG is configured to receive an exhaust gas, heat a first working fluid with the exhaust gas, and route the first working fluid to the steam turbine, where the steam turbine is configured to extract energy from the first working fluid, and where the intercooler is configured to receive a compressed air from the compressor of the gas turbine engine and to cool the compressed air to a first controllable temperature determined by engine controls with a second working fluid having a second controllable temperature suitable for cooling the compressed air to the first controllable temperature determined by the engine controls. The system also includes a first feed heater of a distillation system, where the first feed heater is configured to receive the mixture and the second working fluid such that the second working fluid sinks heat to the mixture. The system also includes a first-effect vessel of the distillation system. The first-effect vessel is configured to receive the mixture from the first feed heater and to receive the first working fluid from the steam turbine, such that the first working fluid sinks heat to the mixture.

19 Claims, 4 Drawing Sheets

(51) Int. Cl.

| | | |
|---|---|---|
| *F02C 3/04* | (2006.01) | |
| *F02C 7/143* | (2006.01) | |
| *F01K 3/18* | (2006.01) | |
| *F01K 7/16* | (2006.01) | |
| *F01K 17/02* | (2006.01) | |
| *F01K 19/10* | (2006.01) | |
| *B01D 3/14* | (2006.01) | |
| *B01D 3/00* | (2006.01) | |
| *C02F 103/02* | (2006.01) | |

(52) U.S. Cl.
CPC ............... *F01K 3/185* (2013.01); *F01K 7/16* (2013.01); *F01K 17/02* (2013.01); *F01K 19/10* (2013.01); *F02C 3/04* (2013.01); *F02C 7/143* (2013.01); *C02F 2103/023* (2013.01); *C02F 2303/10* (2013.01); *F05D 2220/31* (2013.01); *F05D 2220/32* (2013.01); *F05D 2220/62* (2013.01); *F05D 2260/211* (2013.01); *F05D 2270/303* (2013.01)

(56) References Cited

U.S. PATENT DOCUMENTS

| | | | |
|---|---|---|---|
| 2,636,485 A | 4/1953 | Hillier | |
| 3,147,072 A | 9/1964 | Thomsen | |
| 3,289,402 A | 12/1966 | Jung et al. | |
| 3,376,204 A | 4/1968 | Tidball | |
| 3,489,652 A | 1/1970 | Williamson | |
| 3,875,017 A | 4/1975 | Saari et al. | |
| 3,953,966 A | 5/1976 | Martz et al. | |
| 3,955,358 A | 5/1976 | Mart et al. | |
| 4,094,747 A | 6/1978 | Pfenninger | |
| 4,207,842 A | 6/1980 | Kehlhofer | |
| 4,238,296 A | 12/1980 | Sadhukhan | |
| 4,310,387 A | 1/1982 | Sadhukhan | |
| 4,330,373 A | 5/1982 | Liu | |
| 4,751,814 A | 6/1988 | Farrell | |
| 4,896,499 A | 1/1990 | Rice | |
| 5,386,685 A | 2/1995 | Frutschi | |
| 5,622,605 A | 4/1997 | Simpson et al. | |
| 5,678,401 A | 10/1997 | Kimura | |
| 5,884,470 A | 3/1999 | Frutschi | |
| 5,925,223 A | 7/1999 | Simpson et al. | |
| 5,952,223 A | 9/1999 | Kaplan et al. | |
| 6,223,523 B1 | 5/2001 | Frutschi | |
| 6,224,716 B1 | 5/2001 | Yoder | |
| 6,833,056 B1 | 12/2004 | Kamiya et al. | |
| 7,073,337 B2 | 7/2006 | Mangin | |
| 7,197,876 B1 | 4/2007 | Kalina | |
| 7,269,956 B2 | 9/2007 | Gericke et al. | |
| 7,614,367 B1 | 11/2009 | Frick | |
| 7,698,323 B1 | 4/2010 | Rangan et al. | |
| 7,799,178 B2 | 9/2010 | Eddington | |
| 8,328,995 B2 | 12/2012 | Eddington | |
| 8,545,681 B2 | 10/2013 | Shapiro et al. | |
| 8,899,008 B2 | 12/2014 | Jones et al. | |
| 10,118,108 B2 * | 11/2018 | Watkins | B01D 3/146 |
| 2003/0057165 A1 | 3/2003 | Carson | |
| 2003/0121856 A1 | 7/2003 | Voutchkov | |
| 2004/0237539 A1 | 12/2004 | Mangin | |
| 2005/0121532 A1 | 6/2005 | Reale et al. | |
| 2005/0235625 A1 | 10/2005 | Gericke et al. | |
| 2006/0076428 A1 | 4/2006 | Knight et al. | |
| 2006/0157338 A1 | 7/2006 | Eddington | |
| 2006/0157410 A1 | 7/2006 | Hassan | |
| 2007/0006565 A1 | 1/2007 | Fleischer et al. | |
| 2007/0215453 A1 | 9/2007 | Eddington | |
| 2010/0326076 A1 | 12/2010 | Ast et al. | |
| 2011/0137892 A1 | 6/2011 | Bisson et al. | |
| 2011/0147195 A1 * | 6/2011 | Shapiro | C02F 1/16 203/10 |
| 2012/0048215 A1 | 3/2012 | Hicks et al. | |
| 2012/0159923 A1 * | 6/2012 | Freund | F01K 23/10 60/39.182 |
| 2012/0216502 A1 | 8/2012 | Freund et al. | |
| 2013/0263928 A1 | 10/2013 | Inoue et al. | |
| 2013/0270100 A1 | 10/2013 | Kwak et al. | |
| 2015/0298024 A1 | 10/2015 | Watkins | |
| 2016/0138798 A1 | 5/2016 | Assmann et al. | |
| 2016/0245125 A1 | 8/2016 | Watkins et al. | |

FOREIGN PATENT DOCUMENTS

| | | |
|---|---|---|
| CN | 101384323 | 12/2013 |
| DE | 849040 | 9/1952 |
| EP | 1921281 | 5/2008 |
| EP | 2345799 | 6/2010 |
| EP | 2345799 A2 | 7/2011 |
| EP | 2410153 | 1/2012 |
| EP | 2516334 | 10/2012 |
| EP | 2630342 | 9/2014 |
| EP | 2937542 | 10/2015 |
| JP | 59203812 A | 11/1984 |
| JP | 2006070889 A | 3/2006 |
| WO | 2007095289 | 8/2007 |
| WO | 2011014715 | 2/2011 |
| WO | 2011078907 | 6/2011 |
| WO | 2015000536 | 1/2015 |

* cited by examiner

SYSTEM AND METHOD OF INTERFACING INTERCOOLED GAS TURBINE ENGINE WITH DISTILLATION PROCESS

BACKGROUND

The subject matter disclosed herein relates to intercooled gas turbine engines and associated cooling systems.

Gas turbine engines include one or more turbine stages driven by hot gases of combustion. For example, a gas turbine engine includes a compressor section, a combustor section, and a turbine section. The compressor section includes one or more compressor stages configured to compress an oxidant (e.g., air), which is then routed to the combustor section. The combustor section includes one or more combustors configured to combust a fuel with the oxidant (e.g., air) to generate the hot gases of combustion. The turbine section includes one or more turbine stages driven by the hot gases of combustion, where the hot gases of combustion pass through the stages to environment as exhaust. The gas turbine engine generates a considerable amount of heat, and thus one or more cooling systems may be used to cool sections of the gas turbine engine. Unfortunately, the cooling systems generally discharge extracted heat into the atmosphere as waste heat, and the exhaust (which also includes waste heat) exiting the turbine section is generally discharged as well.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment, a system includes a gas turbine system having a heat recovery steam generator (HRSG), a compressor, an intercooler, and a steam turbine. The HRSG is configured to receive an exhaust gas, heat a first working fluid with the exhaust gas, and route the first working fluid to the steam turbine, where the steam turbine is configured to extract energy from the first working fluid, and where the intercooler is configured to receive a compressed air from the compressor of the gas turbine engine and to cool the compressed air to a first controllable temperature determined by engine controls with a second working fluid having a second controllable temperature suitable for cooling the compressed air to the first controllable temperature determined by the engine controls. The system also includes a first feed heater of a distillation system, where the first feed heater is configured to receive the mixture and the second working fluid such that the second working fluid sinks heat to the mixture. The system also includes a first-effect vessel of the distillation system. The first-effect vessel is configured to receive the mixture from the first feed heater and to receive the first working fluid routed (e.g., exhausted) from the steam turbine, such that the first working fluid sinks heat to the mixture and is condensed.

In a second embodiment, a system includes a controller configured to regulate at least one valve to control a first controllable flow and a first controllable temperature of an intercooler working fluid through an intercooler of a gas turbine engine and through a feed heater of a distillation system, such that the first controllable temperature of the intercooler working fluid is suitable for cooling a compressed air routed from a compressor of the gas turbine engine to the intercooler of the gas turbine engine to a second controllable temperature determined by the controller, and such that the first controllable temperature of the intercooler working fluid is suitable for preheating a mixture in the feed heater of the distillation system.

In a third embodiment, a method includes flowing an intercooler working fluid through an intercooler of a gas turbine engine. The method also includes sinking heat from a compressed air of a compressor of the gas turbine engine to the intercooler working fluid within the intercooler. The method also includes flowing the intercooler working fluid from the intercooler to a first feed heater of a multi-effect distillation system. The method also includes sinking heat from the intercooler working fluid to a mixture within the first feed heater of the multi-effect distillation system. The method also includes controlling, based on input from controls of the gas turbine engine, a first temperature of the compressed air by controlling a second temperature of the intercooler working fluid.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
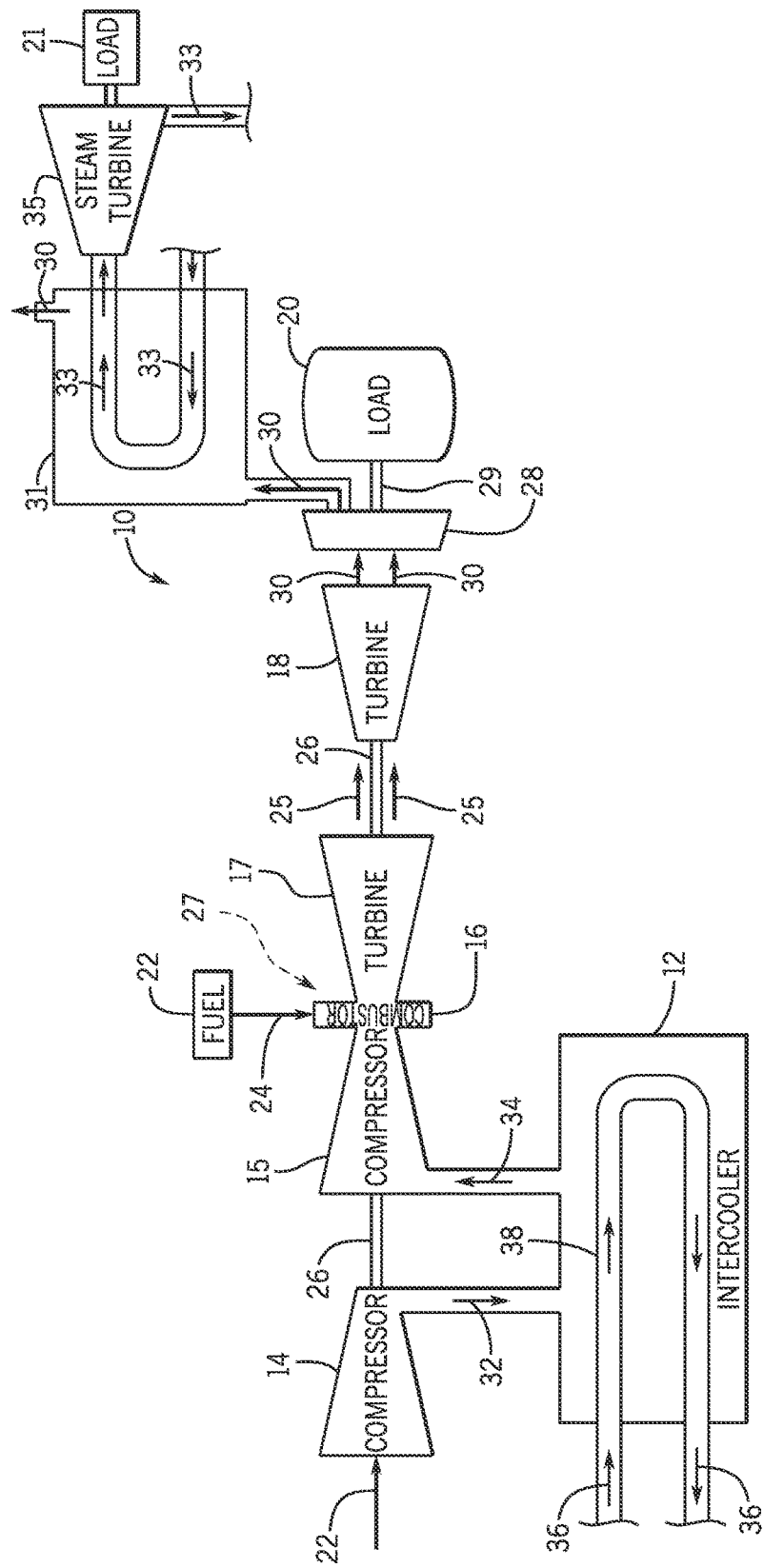
FIG. 1 is a schematic block diagram illustrating a turbine engine having an intercooler, HRSG, and steam turbine in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is directed to engines (e.g., gas turbine engines), intercoolers of engines, exhaust heat recovery steam generators (HRSGs) of engines, and multi-effect distillation systems. Specifically, the present disclosure includes a turbine engine integrated with a multi-effect distillation system via an intercooler of the turbine engine and via an exhaust HRSG (and steam turbine) of the turbine engine, where steam generated from exhaust exiting the turbine engine and a working fluid (e.g., intercooler working fluid) of the intercooler serve as heat sources for the multi-effect distillation system. Embodiments of the present disclosure are discussed in the context of a gas turbine engine and an intercooler, exhaust HRSG, and steam turbine thereof. However, in other embodiments in accordance with the present disclosure, a different type of engine with an accompanying intercooler may be integrated with the multi-effect distillation system. For example, the engine may be a reciprocating engine. The multi-effect distillation system integrated with the engine and intercooler includes a number of effects (e.g., boiling effects) that each occur within an effect vessel of the multi-effect distillation system.

Present embodiments of the disclosure include a turbine engine that includes a compressor configured to compress air for use in a combustor (e.g., a combustion chamber) of the turbine engine. The compressed air may be heated due to mechanical compression in the compressor. Efficiency of the turbine engine is generally enhanced by cooling the compressed air to a controlled temperature before delivery to subsequent stages of the compression process and before ultimately being delivered to the combustor for combustion. Accordingly, an intercooler may be used as a heat exchanger for the compressed air. For example, air may be compressed in a first stage of the compressor, and the compressed air may be routed from the first stage into the intercooler. A working fluid (e.g., water) is routed through coils or tubes in the intercooler to extract heat from the compressed air passing across the coils or tubes. In other words, the compressed air sinks heat to the working fluid (e.g., intercooler working fluid). In general, the working fluid includes a controllable temperature, such that the working fluid is delivered to the intercooler at a suitable temperature for cooling the compressed air to a temperature (e.g., a precise temperature) determined by controls of the engine. The cooled compressed air is delivered back to the compressor (e.g., subsequent stages of the compressor) at the temperature determined by the engine controls and facilitated by heat exchange with the working fluid. The cooled compressed air is then further compressed (and, thus, heated) as it is delivered to the combustor of the turbine engine. The heated working fluid may be routed from the intercooler to a multi-effect distillation system, where the working fluid is used as a supplemental heat source for preheating (e.g., sinking heat to) a mixture entering into each effect vessel (or a subset of effect vessels) of the multi-effect distillation system.

An "effect" used herein, with respect to the multi-effect distillation system, relates to separation of a mixture (e.g., via boiling of one fluid mixture with a working fluid). For example, each effect vessel may receive a salt water mixture (or any other fluid, as set forth below, capable of being, or needing to be, distilled), and a heat source (e.g., heated fluid, heated water, steam, distillate steam, or vapor) may boil water off the salt water mixture. The heated working fluid from the intercooler may be utilized to preheat, in each effect vessel (or in each subset of effect vessels), a mixture being distilled via the multi-effect distillation system. Accordingly, heat extracted from the compressed air is recycled for use in the multi-effect distillation system instead of being rejected to a heat sink and otherwise wasted, i.e., as waste heat.

In addition to the working fluid (e.g., intercooler working fluid) of the intercooler serving as a supplemental heat source for preheating the mixture in each effect vessel (or in a subset of effect vessels), heat extracted from exhaust of the gas turbine engine may be utilized as a primary heat source for driving a first effect in a first-effect vessel of the multi-effect distillation system. For example, after the compressed air is delivered to the combustor in the gas turbine engine as described above, the compressed air is mixed with a fuel and is subsequently combusted with the fuel in the combustor to generate hot combustion gases. The hot combustion gases then drive the turbine of the gas turbine engine, causing the turbine to drive a load of the gas turbine engine or a load coupled to the gas turbine engine. After driving the turbine (e.g., into rotation), the hot combustion gases are expelled from the turbine as exhaust. The hot exhaust may be cycled through a HRSG, such that the hot exhaust at least partially heats or vaporizes an additional working fluid (e.g., to generate steam). The additional working fluid (e.g., the steam) may include too much energy to route to directly to the first-effect vessel of the multi-effect distillation system to drive the first effect of the first-effect vessel. Accordingly, the additional working fluid (e.g., the steam) may be routed through an additional turbine (e.g., steam turbine), which extracts energy from the additional working fluid (e.g., the steam) to power a load. Then, the additional working fluid (e.g., the steam or steam exhaust working fluid) may be routed to the first-effect vessel of the multi-effect distillation system to drive the first effect in the first-effect vessel, as described in detail below.

Multi-effect distillation systems are generally used for separating a distillate from a concentrate, where the distillate and the concentrate make up a mixture, as described above. For example, the mixture may be salt water, where the distillate is purified water and the concentrate is brine. Other examples of the mixture will be described below.

In one embodiment, the steam exiting the HRSG described above is passed or routed first through the steam turbine, and then to the first-effect vessel of the multi-effect distillation system that contains the mixture (e.g., a raw aqueous solution including the distillate and the concentrate). In the first-effect vessel, the steam exchanges heat with the mixture to (a) drive the first effect of the multi-effect distillation system and (b) such that the steam becomes water that is pumped back to the HRSG. The mixture is boiled to generate distillate steam (e.g., distillate vapor) that is exported to a second-effect vessel of the multi-effect distillation system to drive a second effect in the second-effect vessel. Additionally, the mixture from the first-effect vessel is routed to the second-effect vessel, where the distillate vapor generated by the first effect in the first-effect vessel is used as a heat source for boiling the mixture (and any preheated mixture that might be added) in the second-effect vessel. The mixture in the second-effect vessel (e.g., routed to the second-effect vessel from the first-effect vessel) has a higher concentration of concentrate than the mixture in the first-effect vessel because a portion of distillate steam (e.g., the distillate vapor) is boiled off the mixture in the first-effect vessel, as previously described. Accordingly, as the mixture is passed to subsequent-effect vessels, the ratio of concentrate to distillate increases as more and more distillate steam (e.g., the distillate vapor) is boiled off from the mixture. The effect vessels may be coupled in series, such that each successive effect vessel utilizes heat generated by the preceding effect (e.g., boiling) in the preceding effect (e.g., boiling) vessel for the effect in the next successive effect vessel. It should be noted that, as described above, a heated working fluid from the intercooler of the gas turbine engine may be utilized to preheat each mixture of each effect vessel prior to the mixture entering the effect vessel. Preheating the mixture prior to the mixture entering each vessel (e.g., with the working fluid from the intercooler) may reduce the amount of heat required to be provided by the distillate steam (or, in the first-effect vessel, by the steam generated by the HRSG and routed through the steam turbine) to separate the distillate from the concentrate in each effect vessel. Thus, utilizing the intercooler working fluid, the HRSG/turbine working fluid (e.g., the steam), and the distillate steam enables embodiments with more effect vessels (e.g., of the multi-effect distillation system) over embodiments that do not sufficiently preheat the mixture in accordance with the present disclosure.

The process is repeated over any number of effect vessels until the mixture includes a desired concentration of concentrate, at which point the concentrate is then exported from the system (e.g., for other uses). Additionally, the distillate steam generated in each effect vessel loses heat to the mixture in subsequent effect vessel(s) (e.g., as the distillate steam drives the effects in the subsequent effect vessel(s)), condenses, and is exported from the subsequent effect vessel(s) as liquid distillate. Thus, the multi-effect distillation system generates two byproducts: liquid distillate and concentrate (or liquid distillate and a mixture with a high concentrate content). As previously described, preheating the mixture entering each effect vessel prior to the mixture entering the effect vessel may enable a larger number of effect vessels compared to embodiments that do not preheat the mixture, thereby increasing an amount of byproducts (e.g., distillate and concentrate) produced by the multi-effect distillation system. Preheating the mixture entering each effect vessel may also increase efficient use of the heat generated by the gas turbine engine. The liquid distillate produced from the multi-effect distillation system may be reused in the combustor of the turbine engine instead of importing raw water resources, which may in turn reduce $NO_x$ or emissions of oxides of Nitrogen. Additionally, cost savings enabled by the recycling of heat in the working fluid may enable cost allocation in other areas of the system that may increase the quality, performance, and/or efficiency of the system, as set forth throughout the present disclosure.

As will be appreciated, the multi-effect distillation system may include many different applications, depending on the embodiment. For example, the multi-effect distillation system may be a multi-effect desalinization system. In other words, the multi-effect distillation system may be used to generate fresh water distillate and a highly concentrated salt water (e.g., brine). Further, the multi-effect distillation may be used in applications involving raw water (e.g., well, lake, pond, or river water) purification, gray water purification, black water treatment, sugar juice concentration (e.g., to generate fresh water distillate and a highly concentrated sugar syrup), fruit juice concentration, black liquor concentration (e.g., in the paper industry), frack water concentration, produced brine water concentration, mine waste concentration, nuclear radiation waste concentration, or mixtures including one or more of petroleum, natural gas, petrochemicals, ethanol, or some other chemical. The present disclosure is intended to include any compatible multi-effect distillation system (e.g., with a mixture including any distillate and/or concentrate) for which the working fluid of the intercooler for the gas turbine engine can be used as a heat source, and the scope of the present disclosure is not limited to a multi-effect distillation system of any particular mixture.

It should be noted that the working fluid flowed between the intercooler and the multi-effect distillation system may be flowed through a closed loop. For example, in certain embodiments, no portions of the working fluid are routed away from the closed loop. Portions of the closed loop may be blocked by bypass valves and other components, enabling the working fluid to bypass, for example, the distillation system. However, the working fluid is still flowed to and from the intercooler and, thus, the working fluid is still flowed through the closed loop (e.g., smaller portions of the closed loop).

Turning now to the figures, FIG. 1 is a block diagram illustrating an embodiment of a turbine engine 10 with an intercooler 12. In the illustrated embodiment, the turbine engine 10 includes a compressor first stage 14, a compressor second stage 15, a combustor 16 (e.g. combustion chamber), a turbine first stage 17, a turbine second stage 18, and a load 20 (e.g., driven component), among other components set forth below. The combustor 16 includes a fuel nozzle 22 which routes fuel 24 (e.g., gaseous and/or liquid fuel), such as natural gas, syngas, or petroleum distillates, into the combustor 16. In certain embodiments, the gas turbine engine 10 may include multiple combustors 16, each with one or more fuel nozzles 22.

In the illustrated embodiment, the combustor 16 ignites and combusts an air-fuel mixture (e.g., the air from the compressor stages 14, 15, and the fuel 24 from the fuel nozzle 22), and passes resultant hot pressurized combustion gases 25 (e.g., combustion products) to the turbines stages 17, 18. The turbine second stage 18 is coupled to a first shaft 26 and the turbine first stage 17 is coupled to a second shaft 27, where the second shaft 27 is hidden in the illustrated embodiment by the combustor 16. The first shaft 26 is also coupled to the compressor first stage 14, and the second shaft 27 is also coupled to the compressor second stage 15. As the combustion gases 25 (e.g., combustion products) pass through the turbine blades in the turbine first and second stages 17, 18, the turbine stages 17, 18 are driven into rotation, which causes the shafts 27, 26, respectively, to rotate, where the shafts 27, 26 are, as described above, coupled to the compressors 15, 14. Thus, the turbine blades extract work from the combustion gases 25, such that the turbine stages 17, 18 drive the compressor stages 15, 14, respectively, via the shafts 27, 26, respectively.

Further, the combustion gases 25 exit the turbine second stage 18 as exhaust gas 30 and enter into a third turbine 28, driving turbine blades of the third turbine 28. The third turbine 28 is coupled to the load 20 via a third shaft 29. Accordingly, the third turbine 28 extracts work from the exhaust gas 30 to drive the load 20, and exhaust gas 30 exits the engine 10 (e.g., via an exhaust gas outlet). As described in detail below and in accordance with the present disclosure, the exhaust gas 30 expelled through the exhaust gas outlet may be routed through a heat recovery steam generator (HRSG) 31. The HRSG 31 may receive the exhaust gas 30 and a working fluid 33 (e.g., water), such that heat is exchanged from the exhaust gas 30 to the working fluid 33 (e.g., steam exhaust working fluid). In some embodiments, the heated working fluid 33 may be steam (or become steam after being heated by the exhaust gas 30). The working fluid 33 may then be routed through a steam turbine 35, which extracts energy (e.g., heat) from the working fluid 33 to power a load 21 coupled to the steam turbine 35 (e.g., via a shaft). As will be described in detail below with reference to later figures, the heated working fluid 33 (e.g., steam) may be utilized to drive other processes, such as a multi-effect distillation process. For example, after passing through the steam turbine 35, the working fluid 33 (which may still be steam) may be routed to the multi-effect distillation process.

It should be noted that the load(s) 20, 21 (e.g., driven component[s]) may be any suitable device(s) that may generate power via the rotational output of the turbine engine 10, such as a power generation plant or an external mechanical load. It should be noted that load 20 and load 21 may be separate loads, as shown, or, in another embodiment, the same load. In one embodiment, the load(s) 20, 21 may include an electrical generator, a compressor of a process gas, or a combination thereof, and so forth.

Continuing with the illustrated embodiment, compressor blades may be included as components of the compressors 14, 15. The blades within the compressors 14, 15 are coupled to the shafts 27, 26, such that the compressor blades will rotate as the shafts 27, 26 are driven to rotate by the turbines 17, 18, as described above. The rotation of the blades within the compressors 14, 15 causes compression of the air entering the compressors 14, 15, thereby generating compressed air 32. Due to mechanical compression of the air in the compressors 14, 15, the compressed air 32 is generally elevated in temperature. For example, compressed air 32 exiting the compressor first stage 14 is generally heated due to mechanical compression in the compressor first stage 14. Efficiency of the turbine engine 10 is enhanced by delivering cooled compressed air 34 to be further compressed in subsequent compressor stages (e.g., the compressor second stage 15), where the cooled compressed air 34 delivered to the compressor second stage 15 will be compressed and heated again before deliver to the combustor 16. Thus, the compressed air 32 may be routed into the intercooler 12 of the turbine engine 10 from the compressor first stage 14, where a second working fluid 36 (e.g., intercooler working fluid) is routed through the intercooler 12 to absorb heat from the compressed air 32.

In the illustrated embodiment, the second working fluid 36 is routed through one or more coils 38 in the intercooler 12. The second working fluid 36 extracts heat from the compressed air 32 to generate cooled compressed air 34 and to heat the second working fluid 36. The cooled compressed air 34 is then delivered to the compressor second stage 15 at a controlled temperature (as set forth below with reference to later figures) for additional compression and heating before being sent to the combustor 16. The second working fluid 36 (i.e., heated second working fluid) exits the intercooler 12 at a higher temperature than the second working fluid 36 was when it entered the intercooler 12. In existing designs, the second working fluid 36 generally deposits heat to a heat sink, such that the second working fluid 36 may be delivered back to the intercooler 12 at a desired (e.g., lower) temperature thereby wasting the heat. However, it would be advantageous to recycle heat extracted by the second working fluid 36 from the compressed air 32 by routing the second working fluid 36 to some other system or component external to the turbine engine 10, where the heat may be utilized to perform some other role or function. For example, in accordance with the present disclosure, the second working fluid 36 (e.g., heated second working fluid) may be routed to a multi-effect distillation system, where the second working fluid 36 may be used as a heat source (e.g., supplemental heat source) for preheating a mixture of a multi-effect distillation system (e.g., prior to the mixture being distilled) thereby cooling the second working fluid 36 to a suitably controlled temperature.

Figure 2:
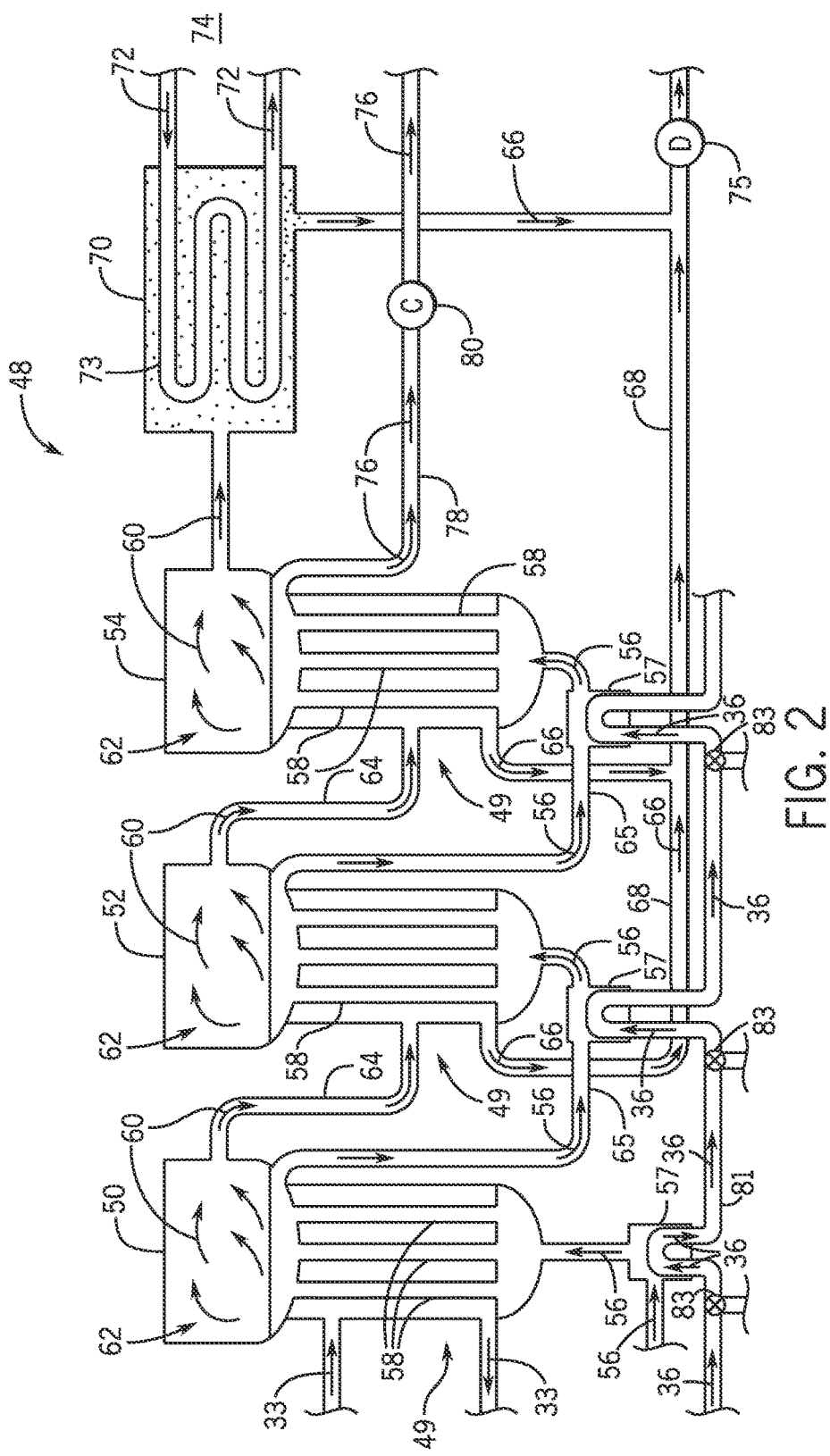
FIG. 2 is a schematic block diagram illustrating an embodiment of a multi-effect distillation system utilizing a working fluid, in accordance with embodiments of the present disclosure.

With the foregoing in mind, FIG. 2 is a block diagram illustrating an embodiment of a multi-effect distillation system 48. In the illustrated embodiment, the multi-effect distillation system 48 includes a first-effect vessel 50, a second-effect vessel 52 (e.g., intermediate-effect vessel), and a last-effect vessel 54. However, any number of effect vessels may be used in the multi-effect distillation system 48. For example, the multi-effect distillation system 48 may include 2, 3, 4, 5, 6, 7, 8, 9, 10, 11, 12, 13, 14, 15, 16, or more effect vessels for as many effects (e.g., one effect per effect vessel) as desired. Additionally, if one intermediate-effect vessel is considered more important than another (e.g., if one is found to be more efficient than another), lubricating oil cooling, jacket water cooling, or other engine waste heat producers can be introduced into the multi-effect distillation process 48 at the particular effect vessel where temperature of that waste heat producer is most beneficial to the distillation process.

In the illustrated embodiment, a working fluid (e.g., the working fluid 33 [or steam] from the steam turbine 35 described above with reference to FIG. 1) may enter into a heat exchange portion 49 of the first-effect vessel 50. Also routed through the heat exchange portion 49 of the first-effect vessel 50 is a mixture 56 containing a component to be distilled and a component to be concentrated. In accordance with the present disclosure, the distillate may be fresh water or some other liquid distillate. Additionally, the concentrate may be salt, sugar, black liquor, fruit juice, or any other compound or element that could benefit from the multi-effect distillation system 48 of the present disclosure. As shown, the mixture 56 entering the first-effect vessel 50 may first be preheated via one of a group of feed heaters 57 (e.g., preheating heat exchangers). A working fluid (e.g., the heated second working fluid 36 from the intercooler 12 described with reference to FIG. 1) may also be routed through tubes of the feed heater 57. Heat may be transferred from the second working fluid 36 to the mixture 56 (e.g., sunk from the second working fluid 36 to the mixture 56), such that the mixture 56 is preheated to a desirable temperature (e.g., just below a boiling temperature of the distillate of the mixture 56), which may enhance an efficiency of the multi-effect distillation system 48 (and corresponding process).

In the illustrated embodiment, the mixture 56 (e.g., preheated mixture) is routed through tubes 58 (or some other suitable heat exchange surface[s]) in the heat exchange portion 49 of the first-effect vessel 50. The mixture 56 extracts heat from the working fluid (e.g., working fluid 33), which is external to the tubes 58 but within the heat exchange portion 49, such that the mixture 56 is boiled. In other words, the working fluid 33 sinks heat to the mixture 56. In some embodiments, the working fluid (e.g., working fluid 33) may be routed through the tubes 58 and the mixture 56 may be external to the tubes 58, but within the heat exchange portion 49 of the first-effect vessel 50.

Further, as indicated above, the heat exchange portion 49 may include some other type of heat exchange surface. For example, the heat exchange portion 49 may include plate type heat exchangers that utilize plates as opposed to tube type heat exchangers that utilize the tubes 58. For example, the heat exchange portion 49 may include a compartment configured to receive the mixture 56 and a compartment configured to receive the working fluid (e.g., working fluid 33), where the compartments are separated by a metal plate. The metal plate disposed between the compartments is thermally conductive, such that the metal plate conducts heat from the working fluid (e.g., working fluid 33) and transfers the heat to the mixture 56. In another embodiment, multiple metal plates may be included to separate multiple compartments, where one or more compartments receive the mixture 56 and one or more compartments receive the working fluid (e.g., working fluid 33), and each metal plate is configured to transfer heat from the working fluid (e.g., working fluid 33) to the mixture 56. Further still, the heat exchange portion 49 may include membrane type heat exchangers that utilize tanks that include one or more membranes and/or one or more cooling foils. For example, the mixture 56 may be heated in a first tank, such that vapor distillate passes through the membrane of the tank and contacts a cooling foil of the next tank, which extracts heat from the vapor distillate and condenses the vapor distillate into liquid distillate. Additionally, the foil may be heated by the distillate steam 60, such that the mixture 56 within the tank having the foil is heated, and the process is continued. Indeed, any suitable type of heat exchanger configured to transfer heat between two fluids may be used in accordance with present embodiments.

In the above described configuration (e.g., including heat exchange portions 49 with either tubes 58 or plates), a portion of the mixture 56 (e.g., distillate) may be boiled and evaporated from the mixture 56 to generate distillate steam 60 (e.g., distillate vapor) in a bulb enclosure 62 of the first-effect vessel 50 above the heat exchange portion 49. The working fluid (e.g., working fluid 33) may lose heat and exit the heat exchange portion 49 of the first-effect vessel 50, such that the working fluid (e.g., working fluid 33) may be exported from the first-effect vessel 50 for use elsewhere (e.g., back to the HRSG 31 described with reference to FIG. 1, or to intervening components between the first-effect vessel 50 and the HRSG 31), as will be described in detail below with reference to FIG. 4.

In the bulb enclosure 62 of the first-effect vessel 50 (e.g., first-boiling vessel), the distillate steam 60 is routed via a steam passageway 64 to the second-effect vessel 52 (e.g., second-boiling vessel), or intermediate-effect vessel (e.g., intermediate-boiling vessel). The distillate steam 60 enters the heat exchange portion 49 of the second-effect vessel 52 from the steam passageway 64. Additionally, a portion of the mixture 56 is routed from the first-effect vessel 50 to the second-effect vessel 52 via a mixture passageway 65. The portion of the mixture 56 in the mixture passageway 65 passes through another one of the feed heaters 57 that preheats the mixture 56 via the second working fluid (e.g., second working fluid 36), as described above. The preheated mixture 56 from the second feed heater 57 is then routed through tubes 58 in the heat exchange portion 49 of the second-effect vessel 52. The mixture 56 in the tubes 58 of the second-effect vessel 52 extracts heat from the distillate steam 60 in the heat exchange portion 49, such that the mixture 56 in the second-effect vessel 52 boils and generates distillate steam 60 in the bulb enclosure 62 above the heat exchange portion 49 of the second-effect vessel 52. Additionally, the distillate steam 60 in the heat exchange portion 49 of the second-effect vessel 52, used as the heat source in the second-effect vessel 52, loses heat to the mixture 56 in the tubes 58, condenses into liquid distillate 66, and is exported to the liquid distillate line 68. The distillate line 68 may export the liquid distillate 66 elsewhere as a product of the multi-effect distillation system 48.

The distillate steam 60 generated in the bulb enclosure 62 of the second-effect vessel 52 is then routed via the steam passageway 64 and enters into the heat exchange portion 49 of the last-effect vessel 54, where the distillate steam 60 is used as a heat source for heating the mixture 56. The mixture 56 is exported from the second-effect vessel 52 to the last-effect vessel 54 (or through subsequent effect-vessels and then to the last-effect vessel 54) via the mixture passageway(s) 65, where it enters the heat exchange portion 49. As previously described, the mixture 56 is preheated via the feed heater 57 (e.g., via the second working fluid 36) disposed along the mixture passageway 65. The preheated mixture 56 is then routed through the tubes 58 and extracts heat from the distillate steam 60, such that the mixture 56 is boiled and generates distillate steam 60 in the bulb enclosure 62 of the last-effect vessel 54. The distillate steam 60 used to heat the mixture 56 (e.g., the distillate steam 60 sent from the bulb enclosure 62 of the second-effect vessel 52 to the heat exchange portion 49 of the last-effect vessel 54) loses heat to the mixture in the last-effect vessel 54, condenses into liquid distillate 66, and is exported to the distillate line 66.

It should be noted that, in the illustrated embodiment, the first-effect vessel 50 includes a first-effect, the last-effect vessel 54 includes a last-effect which will be described in detail below, and the second-effect vessel 52 (e.g., intermediate-effect vessel) includes an intermediate-effect (e.g., the only intermediate-effect). In another embodiment, a different number of effect vessels may be used to include multiple intermediate-effects (e.g., one effect vessel per intermediate-effect). For example, the second-effect vessel 52, a third-effect vessel, a fourth-effect vessel, a fifth-effect vessel, and a sixth-effect vessel may each include an intermediate-effect and may each be referred to as an intermediate-effect vessel. In another embodiment, the multi-effect distillation system may only include a first-effect and last-effect. As previously described, the multi-effect distillation system may include 2, 3, 4, 5, 6, 7, 8, 9, 10, 11, 12, 13, 14, 15, 16, or more effects.

Continuing with the illustrated embodiment, the distillate steam 60 generated in the bulb enclosure 62 of the last-effect vessel 54 is exported to a condenser 70. In some embodiments, the condenser 70 may include an air-ejector for maintaining vacuum in the condenser 70 while drawing the distillate steam 60 into the condenser 70. The mechanism by which the air injector works will be discussed in further detail with reference to FIG. 4. In the illustrated embodiment, a condensing fluid 72 is routed through coils 73 (e.g., tubes) in the condenser 70. The condensing fluid 72 may be the same fluid as the mixture 56 (e.g., originating from a mixture source 74), or it may be some other fluid. The condensing fluid 72 extracts heat from the distillate steam 60 in the condenser 70. Thus, the distillate steam 60 may condense into liquid distillate 66. The liquid distillate 66, in the illustrated embodiment, is exported to the liquid distillate line 68, where the liquid distillate 66 is pumped through the liquid distillate line 68 via a liquid distillate pump 75. The condensing fluid 72, which extracts heat from the distillate steam 60 in the condenser 70, exits the condenser 70 at a temperature greater than the temperature of the condensing fluid 72 when it entered the condenser 70. The heated condensing fluid 72 (e.g., the heated mixture 56) may be exported back to the mixture source 74 (e.g., the mixture source 74 in a power plant (e.g., water tower), or some other mixture source 74), for use in another portion of the multi-effect distillation system 48, or a combination of both. In other words, a portion of the heated condensing fluid 72 may be exported to the sea (e.g., where it initially came from) and a second portion of the heated condensing fluid 72 may be exported to another part of the multi-effect distillation system 48 (e.g., as a portion of the mixture 56 entering the heat exchange portion 49 of the first-effect vessel 50).

As described above, the multi-effect distillation system 48 produces liquid distillate 66. Additionally, a portion of the mixture 56 (e.g., concentrate 76) may be exported from the last-effect vessel 54 as another product of the multi-effect distillation system 48. The exported mixture 56 may include a high ratio of concentrate 76 to distillate 66. This is because the concentrate 76 content in the mixture 56 increases relative to liquid distillate 66 content as the mixture 56 passes from effect vessel to effect vessel (e.g., from the first-effect vessel 50 to the last-effect vessel 54). In other words, because each effect vessel generates distillate steam 60 from the mixture 56 within the effect vessel (e.g., distillate steam 60 substantially void of concentrate 76), the liquid distillate 66 content in the mixture 56 (e.g., relative to concentrate 76 content) decreases. Accordingly, the last-effect vessel 54 includes the highest concentration of concentrate 76 in the mixture 56, as compared to previous effect vessels in the multi-effect distillation system 48. The highly concentrated mixture 56 or, in some embodiments, substantially pure concentrate 76 is exported to a concentrate line 78 and pumped through the concentrate line 78 via a concentrate pump 80. The concentrate pump 80 and the liquid distillate pump 75 export the concentrate 76 and the liquid distillate 66, respectively, from the multi-effect distillation system 48. It should be noted that, in certain embodiments, the concentrate pump 80 and concentrate line 78 may refer to a pump and line used to transport a highly concentrated portion of the mixture 56 (e.g., containing a high concentration of the concentrate 76) from the last-effect vessel 54, as previously described. The terms "concentrate pump" and "concentrate line" are used to differentiate the line from the liquid distillate pump 75 and liquid distillate line 68, respectively, which may be used to transport pure liquid distillate 66.

It should also be noted that, in accordance with the present disclosure, the second working fluid (e.g., working fluid 33 from the intercooler 12) may be passed to each of the feed heaters 57 via a second working fluid line 81, which includes corresponding blend valves 83 for each of the feed heaters 57. For example, the corresponding valves 83 may selectively open and close to enable a certain amount of the second working fluid 36 to enter each of the feed heater 57 (e.g., to continue along the line 81), and/or a certain amount of the second working fluid 36 to bypass the remaining feed heaters 57. After the second working fluid 36 passes through the feed heaters 57, the second working fluid 36 may be directed elsewhere (e.g., back to the intercooler 12) for other purposes. These and other features will be described in detail below with reference to FIG. 4.

Figure 3:
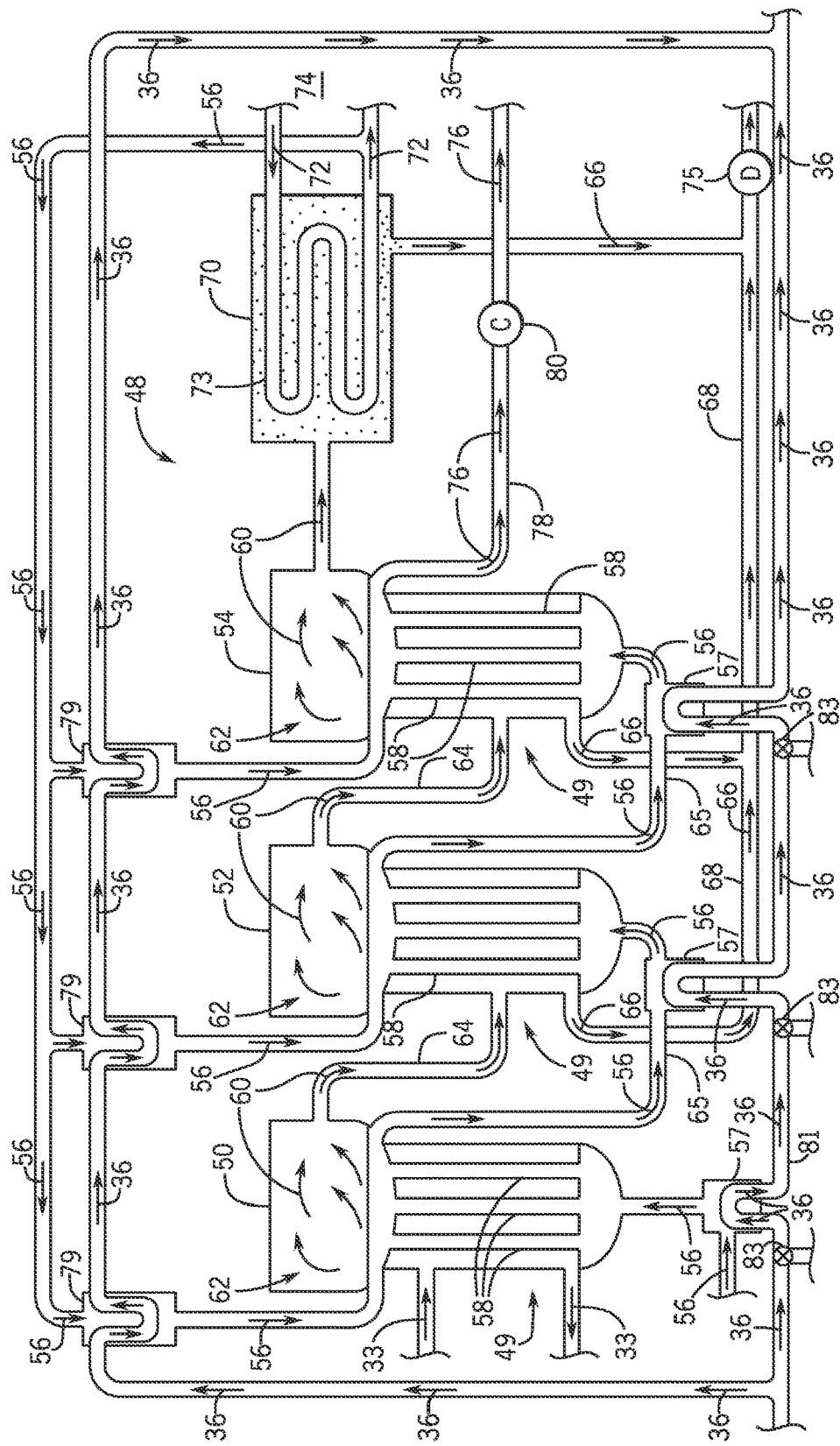
FIG. 3 is a schematic block diagram illustrating an embodiment of a multi-effect distillation system utilizing a working fluid, in accordance with embodiments of the present disclosure.

Turning now to FIG. 3, an embodiment of the multi-effect distillation system 48 in accordance with the present disclosure is shown. In the illustrated embodiment, as described above, the mixture 56 (which may be the condensing fluid 72 routed from the condenser 70) enters the first feed heater 57 and is heated (e.g., preheated) by the second working fluid 36 (e.g., from the intercooler 12 in FIG. 1). The mixture 56 then enters the first-effect vessel 50, where the mixture 56 is then heated by the working fluid 33 (e.g., from the steam turbine 35 in FIG. 1). As the mixture 56 is heated in the heat exchange portion 49, distillate steam 60 is boiled off the mixture 56 and transported to the second-effect vessel 52. A portion of the mixture 56 is then passed to the feed heater 57 of the second-effect vessel 52, where the portion of the mixture 56 is preheated by the second working fluid 36 (e.g., from the intercooler 12 in FIG. 1) prior to delivery of the portion of the mixture 56 to the heat exchange portion 49 of the second-effect vessel 52.

In accordance with the present disclosure, the illustrated embodiment also includes supplemental feed heaters 79, each supplemental feed heater 79 being associated with one of the effect vessels 50, 52, and 54. For example, each supplemental feed heater 79 may receive a portion of the mixture 56 directly from the condensing fluid 72 routed through the condenser 70. In other words, the condensing fluid 79, for example, is the mixture 56, and is received from a source of the mixture 56. After the condensing fluid 79 (e.g., the mixture 56) passes through the condenser 70, the condensing fluid (e.g., the mixture 56) is passed to each of the supplemental feed heaters 79. As previously described, the first feed heater 57 of the first-effect vessel 50 may also receive the condensing fluid 79 (e.g., the mixture 56) directly from the condenser 70.

Accordingly, each effect vessel 50, 52, 54 in the illustrated embodiment receives two inputs of the mixture 56, one from the associated feed heater 57 and one from the associated supplemental feed heater 79. However, all of the feed heaters 57 (except for the first feed heater 57, which receives the mixture 56 from the condenser 70) receive the mixture 56 from the preceding heat exchange portion 49 of the preceding effect vessel, while all of the supplemental feed heaters 79 receive the mixture 56 directly from the condenser 70. In other words, the feed heaters 57 (other than the first feed heater 57) are fed portions of the mixture 56 passed forward by preceding effect vessels, while the supplemental feed heaters 79 are fed portions of the mixture 56 directly from the condenser 70 (e.g., where the condensing fluid 72 passed through the condenser 70 is the mixture 56, and the condensing fluid 72 [or mixture 56] is received from a source).

Figure 4:
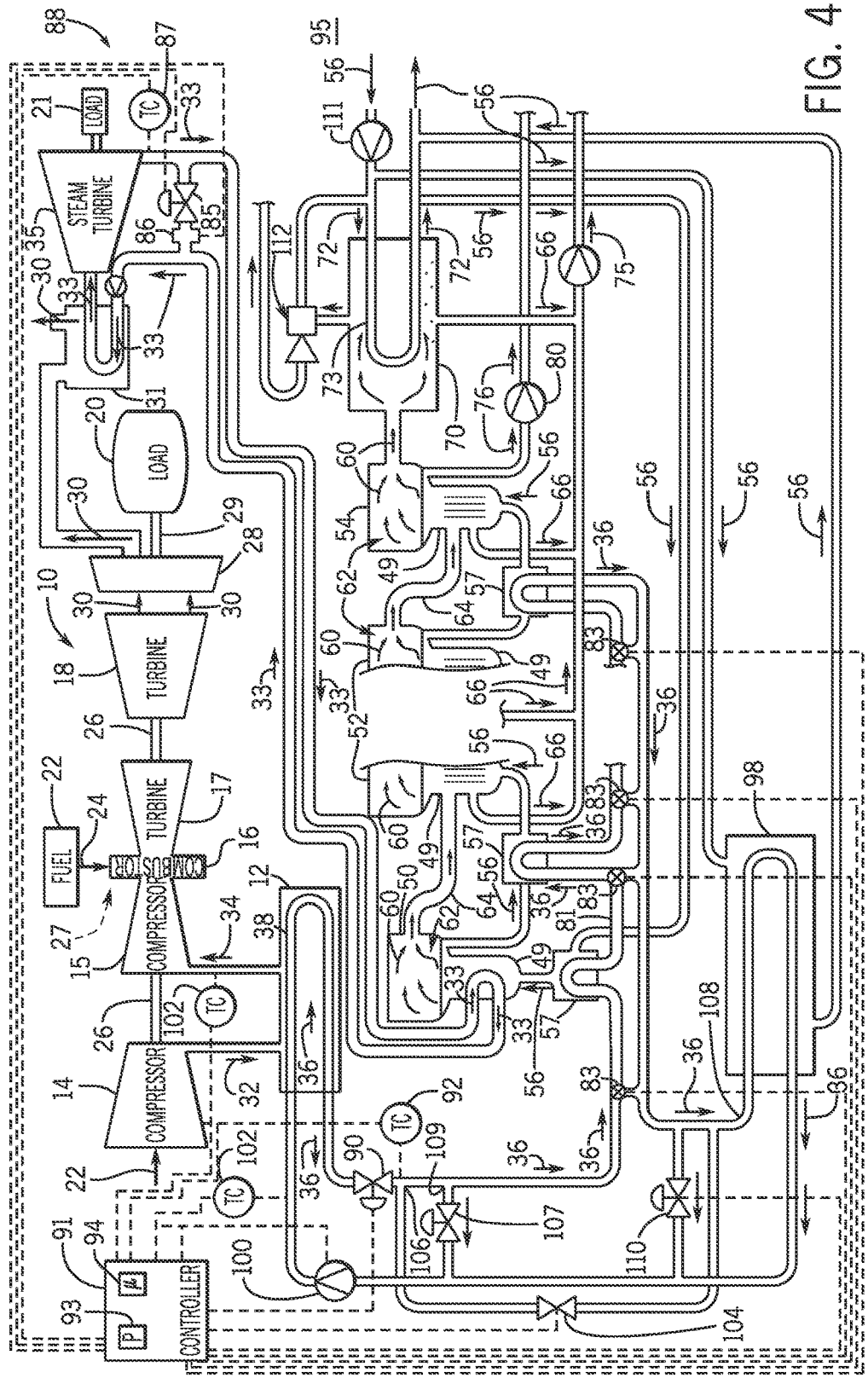
FIG. 4 is a schematic block diagram illustrating the turbine engine of FIG. 1 interfacing with the multi-effect distillation system of FIG. 2 via an intercooler of the turbine engine and exhaust steam component of the turbine engine, in accordance with embodiments of the present disclosure.

Turning now to FIG. 4, an embodiment of an integrated system 88 including the gas turbine system 10 (e.g., of FIG. 1) having the intercooler 12, the HRSG 31, and the steam turbine 35 integrated with the multi-effect distillation system 48 (e.g., of FIG. 2), in accordance with the present disclosure, is shown. It should be noted that the multi-effect distillation system 48 of FIG. 3 is included in accordance with the present disclosure to illustrate how various types of multi-effect distillation system 48 may interface with the gas turbine system 10 (e.g., of FIG. 1) similarly as the multi-effect distillation system 48 of FIG. 2. In other words, while the integrated system 88 of FIG. 4 illustrates interfacing of the gas turbine system 10 of FIG. 1 with the multi-effect distillation system 48 of FIG. 2, one of ordinary skill in the art would recognize how the multi-effect distillation system 48 of FIG. 3 (and other multi-effect distillation systems similar to those shown in FIGS. 2 and 3) would interface similarly (or the in the same manner) as the multi-effect distillation system 48 of FIG. 2.

In the illustrated embodiment, the gas turbine system 10 may function similar to, or the same as, the embodiment of the gas turbine system 10 described with reference to FIG. 1. Additionally, the multi-effect distillation system 48 may function similar, or the same as, to the embodiment of the multi-effect distillation system 48 described with reference to FIG. 2.

In the illustrated embodiment, the working fluid 33 is used as a heat source for the first-effect vessel 50 of the multi-effect distillation system 48. For example, the working fluid 33 may exit the HRSG 31 after extracting heat from the exhaust 30, may lose some energy to the steam turbine 35

(which powers the load 21), and may enter into the heat exchange portion 49 of the first-effect vessel 50.

The working fluid 33 enters the heat exchange portion 49 of the first-effect vessel 50 to boil the mixture 56 entering the first-effect vessel 50, as previously described. In certain embodiments (e.g., in embodiments of the multi-effect distillation system 48 used as a multi-effect desalinization system to distill fresh water from salt water), the working fluid 33 may enter into the heat exchange portion 49 of the first-effect vessel 50 at a temperature within a range of, e.g., approximately 180° F. to 220° F. (82° C. to 105° C.), approximately 190° F. to 215° F. (88° C. to 101° C.), approximately 200° F. to 210° F. (93° C. to 99° C.), or approximately 204° F. to 207° F. (96° C. to 97° C.). Because the working fluid 33 is recycled from the HRSG 31 and steam turbine 35 for use as the heat source in the multi-effect distillation system 48, the multi-effect distillation system 48 may operate without regard to ambient temperature, which may not be the case if some other heating agent from the environment is used. Further, it should be noted that a bypass valve 85 may be included that enables total bypass of the multi-effect distillation system 48 for the working fluid 33. For example, during maintenance of the gas turbine engine 10, the multi-effect distillation system 48, or both, it may be advantageous to isolate the gas turbine engine 10 from the multi-effect distillation system 48. Further, prior to the gas turbine engine 10 reaching operational temperatures, it may be advantageous to isolate the gas turbine engine 10 from the multi-effect distillation system 48. Accordingly, the bypass valve 85 is included to isolate the working fluid 33 from the multi-effect distillation system 48. For example, when set to a first setting (e.g., opened), the bypass valve 85 may isolate the working fluid 33 to flow only through the gas turbine engine 10 (e.g., through the HRSG 31 and the steam turbine 35). When set to a second setting (e.g., closed), the bypass valve 85 may enable the working fluid 33 to flow through the gas turbine engine 10 (e.g., the HRSG 31 and the steam turbine 35) and to the multi-effect distillation system 48.

It should be noted that a heat exchanger 86 may be disposed downstream from the bypass valve 85. The heat exchanger 86 may receive the working fluid 33, for example, if the bypass valve 85 is opened to isolate the working fluid 33 from the multi-effect distillation system 48. The heat exchanger 86, then, may cool the working fluid 33 prior to the working fluid 33 entering the HRSG 31 (e.g., in operational conditions in which the working fluid 33 is isolated from the multi-effect distillation system 48). It should also be noted that, in some embodiments, the heat exchanger 86 may be controllably operated or activated. For example, the heat exchanger 86 may be coupled to a controller 91, and the controller 91 may be coupled to a temperature sensor 87 (or a flow sensor) that measures a temperature (or a flow characteristic, such as a flow rate, mass flow rate, etc.) of the working fluid 33. The controller 91 may include a processor 93 and a memory 94. The processor 93 may execute instructions and/or operate on data stored in the memory 94. The controller 91 may receive, from the temperature sensor 87, signals indicative of the temperature of the working fluid 33. Based on the temperature readings, the controller 91 may open or close the bypass valve 85 to enable the working fluid 33 to bypass the multi-effect distillation system 48.

It should also be noted that, in some embodiments, the controller 91 may operatively activate or deactivate the heat exchanger 86. For example, in some embodiments, the working fluid 33 may pass through the heat exchanger 86 even if the bypass valve 85 is closed. Indeed, the heat exchanger 86 may be disposed on a main path of the working fluid 33 (e.g., immediately adjacent to, and upstream of, the HRSG 31), such that the working fluid 33 flows through the heat exchanger 86 regardless of whether the bypass valve 85 is activated. In such embodiments, the heat exchanger 86 may be controllably activated (e.g., to provide cooling) or deactivated (e.g., to not provide cooling) by the controller 91, depending on whether the bypass valve 85 is opened (e.g., such that the working fluid 33 bypasses the multi-effect distillation system 48) or closed (e.g., such that the working fluid 33 interacts with the multi-effect distillation system 48). Further still, in some embodiments, the bypass valve 85 may be only partially opened to enable only partial bypass of the working fluid 33, which may enable finer tuning of a temperature of the working fluid 33.

While the flow of the working fluid 33 may be controlled via the controller 91 and the bypass valve 85, the mixture 56 entering the first-effect vessel 50 may also be controlled to provide a desired temperature of the mixture 56. For example, in the illustrated embodiment, the mixture 56 entering the first-effect vessel 50 may come from a source 95. Before reaching the first-effect vessel 50, the mixture 56 may be routed through various other portions of the multi-effect distillation system 48. For example, in the illustrated embodiment, a portion of the mixture 56 from the source 95 is routed through the condenser 70 of the multi-effect distillation system 48 to exchange heat with the distillate steam 60 exported from the last-effect vessel 54, as described above with reference to FIG. 2. The mixture 56 is heated to an extent by the condensation of the distillate steam 60 and exported from the condenser 70.

A portion of the mixture 56 exiting the condenser 70 may be returned to the source 95, and another portion of the mixture 56 may be routed to a feed heater 57 of the first-effect vessel 50. The second working fluid 36, which is routed from the intercooler 12 of the gas turbine engine 10 to the feed heater 57 of the first-effect vessel 50, preheats the mixture 56 in the feed heater 57 of the first-effect vessel 50 to a desired temperature. Thus, the mixture 56 is introduced into the heat exchange portion 49 of the first-effect vessel 50 at a desired temperature. In some embodiments, the mixture 56 may enter into the heat exchange portion 49 of the first-effect vessel 50 at a temperature within a range, e.g., of approximately 180° F. to 220° F. (82° C. to 105° C.), approximately 190° F. to 210° F. (88° C. to 99° C.), or approximately 195° F. to 205° F. (91° C. to 96° C.). The temperature of the mixture 56 entering the heat exchange portion 49 of the first-effect vessel 50 may be nearly identical to, but slightly below, the temperature of the working fluid 33 (e.g., from the steam turbine 35) entering the heat exchange portion 49 of the first-effect vessel 50, which may produce an improved heat exchange effect.

It should be noted that the second working fluid 36 (e.g., from the intercooler 12) may be controlled similar to how the working fluid 33 (e.g., from the steam turbine 35) is controlled. For example, a control valve 90 disposed downstream of the intercooler 12 (or, in another embodiment, upstream of the intercooler 12) may open or close based on instructions from the controller 91, which receives temperature measurements (e.g., feedback) from a temperature sensor 92 that measures the temperature of the second working fluid 36 proximate to the control valve 90. In other words, the controller 91 receives temperature measurements from the temperature sensor 92 and, based on a desired temperature of the second working fluid 36, the controller 91 instructs the control valve 90 to widen or narrow to increase or decrease a flow of the second working fluid 36. Control of the control valve 90 (e.g., via the controller 91) facilitates temperature control of the second working fluid 36, at least in part because such control may cause the second working fluid 36 to remain within various heat exchangers for a shorter or longer period of time. As described above and below, various valves and pumps controlled by the controller 91 (in addition to heat exchange with the mixture 56) enable flow, temperature, and/or state control of the second working fluid 36. Thus, the second working fluid 36 is delivered to the intercooler 12 at a controlled temperature suitable for exchanging heat with the compressed air 32 such that the compressed air 32 is returned to the second compressor stage 15 (or other subsequent stage[s]) at a temperature determined by the controller 91 (e.g., a temperature that enhances efficiency of the engine 10).

After losing heat to the mixture 56 in the feed heater 57 of the first-effect vessel 50, the second working fluid 36 is routed from the feed heater 57 to the feed heater 57 of the second-effect (or intermediate-effect) vessel 52, which facilitates preheating of the mixture 56 prior to the mixture 56 entering the second-effect (or intermediate effect) vessel 52. Indeed, each of the first-effect, intermediate effect, and final effect vessels 50, 52, 54 may include a corresponding feed heater 57, which enables preheating of the mixture 56 prior to the mixture 56 entering the corresponding vessel 50, 52, 54. Preheating the mixture 56 in this way may greatly enhance efficiency of the multi-effect distillation system 48. After the second working fluid 36 preheats the mixture 56 in each feed heater 57, the second working fluid 36 is routed back to a cooler 98. The cooler 98 may be configured to further cool the second working fluid 36 by using a portion of the mixture 56 directly from the source 95 to cool the second working fluid 36. In other words, a portion of the mixture 56 may be routed directly from the source 95, as shown in the illustrated embodiment, to the cooler 98, where the mixture 56 extracts heat from the second working fluid 36 (e.g., of the intercooler 12).

The mixture 56 is then routed from the cooler 98 back to the source 95, and the second working fluid 36 exits the cooler 98 at a lower temperature for delivery back to the intercooler 12 of the gas turbine system 10. In certain embodiments, a flow rate of the second working fluid 36 exiting the cooler 98 is controlled by a working fluid pump 100. The working fluid pump 100 may be controlled via the controller 91 in the same manner as the control valve 90 described above. The controller 91 may accept feedback (e.g., temperature measurements) from a temperature sensor 102 in a similar manner as the controller 91 accepts temperature measurements from temperature sensor 92 associated with the control valve 90, as described above. Thus, the controller 91 may control the working fluid pump 100 to decrease or increase a flow rate of the second working fluid 36, thereby controlling an amount of time the second working fluid 36 remains in the cooler 98.

By controlling an amount of time the second working fluid 36 spends in the cooler 98, the pump 100 may control a temperature of the second working fluid 36, thereby maintaining a desired temperature of the second working fluid 36 for enhanced heat exchange with the compressed air 32 in the intercooler 12. Further, in some embodiments, the controller 91 may accept feedback (e.g., temperature measurements) from a temperature sensor 102 disposed between the intercooler 12 and one of the compressors 14, 15 that measures a temperature of the compressed air (e.g., compressed air 32 or 34), in this case the cooled compressed air 34. The controller 91 may then determine an appropriate response and regulate the working fluid pump 100, or some other control valve (e.g., control valve 90) included in FIG. 3. Accordingly, after heat exchange with the temperature-regulated second working fluid 36, the cooled compressed air 34 is delivered to the subsequent stage of the compressor 15 at the appropriate temperature for further compression and heating before delivery to the combustor 16.

It should be noted that another pump 101 may be included that regulates a flow rate of the working fluid 33 (e.g., of the steam turbine 35 and HRSG 31). The pump 101 may operate similarly to the pump 100 of the second working fluid 36. For example, the pump 101 may be controlled by the controller 91, based at least in part on temperature measurements taken by the temperature sensor 87 (which may be disposed at any point along the working fluid 33 path). The controller 91 may instruct the pump 101 to enable a faster or slower flow rate, which in turn may cause the working fluid 33 to pass through the feed heaters 57 at a particular rate or speed. By controlling an amount of time the working fluid 33 remains in the feed heaters 57, the controller 91 (and the pump 101) may control a temperature of the working fluid 33 for enhanced operational conditions.

In the illustrated embodiment, the second working fluid 36 may be routed from a main path of the second working fluid 36 for various reasons. For example, the second working fluid 36 may be routed to a different path than described above to isolate the intercooler 12 of the gas turbine engine 10 from the multi-effect distillation system 48. Further, a portion or all of the second working fluid 36 may be routed from one stage of the main path to another stage of the main path to control a temperature of the second working fluid 36 in a certain portion of the main path. The various available paths for the second working fluid 36 are described in detail below.

For example, a bypass valve 104 may be included to assist in isolating the intercooler 12 of the gas turbine engine 10 from the multi-effect distillation system 48. The bypass valve 104 may also be controlled by the controller 91. The controller 91 may generally control the bypass valve 104 to a first setting (e.g., a closed setting) during operation of the integrated system 88 of the present disclosure, and the controller 91 may control the bypass valve 104 to a second setting (e.g., an open setting) to isolate the gas turbine engine 10 from a portion of the multi-effect distillation system 48 such that maintenance can be performed on one or the other. When the bypass valve 104 is opened, the second working fluid 36 (e.g., from the intercooler 12) may be channeled entirely through the bypass valve 104 from junction 106, such that the second working fluid 36 bypasses the effect vessels 50, 52, 54 and the corresponding feed heaters 57. The second working fluid 36 may be routed back onto the main path of the second working fluid 36 at junction 108, where the second working fluid 36 is routed into the cooler 98. The cooler 98 acts as a heat sink for the second working fluid 36, such that the second working fluid 36 is delivered back to the intercooler 12 at the appropriate temperature for heat exchange with the compressed air 32. The control valve 90 and the working fluid pump 100 may still be utilized and controlled by the controller 91 to assist in controlling the flow rate of the second working fluid 36. As described above, flow control may facilitate control of the temperature of the second working fluid 36 (e.g., by causing the second working fluid 36 to remain within various heat exchangers for a particular period of time). Thus, the second working fluid 36 is delivered to the intercooler 12 at the appropriate temperature, as previously described.

Additionally, the intercooler 12 of the gas turbine engine 10 may be isolated from the multi-effect distillation system 48 via a warm up valve 107 when the gas turbine engine 10 is first powered for operation. Accordingly, the second working fluid 36 (and in some embodiments, the gas turbine engine 10) is "warmed up," as it may take a period of time (e.g., 10 to 15 minutes) before the second working fluid 36 reaches appropriate temperatures and/or the gas turbine engine 10 is working at full capacity and appropriate temperatures. The "warm up" interval (e.g., 10 to 15 minutes) of the gas turbine engine 10 may be as fast as the engine 10 limits permit. Thus, the warm up valve 107 may enable the engine 10 to start and ramp to full power as fast as the engine 10 limits permit, which may not be the case if the warm up valve 107 is not included and the second working fluid 36 is routed through the entire main path of the second working fluid 36 immediately upon start up. In other words, when opened via instructions from the controller 91, the warm up valve 107 may shorten the path of the second working fluid 36, such that the second working fluid 36 does not lose heat along a longer path. The warm up valve 107 may be opened, such that the second working fluid 36 in its entirety is routed from junction 109 through the warm up valve 107 and back to the intercooler 12. In some embodiments, the warm up valve 107 may be configured to route a portion of the second working fluid 36 from junction 109 back to the intercooler 12 (e.g., based on instructions from the controller 91, executed upon receiving temperature measurements from one or more temperatures sensors (e.g., temperature sensor(s) 92 and/or 102)), while a portion of the second working fluid 36 is still delivered to the first-effect vessel 50 of the multi-effect distillation system 48. This may enable enhanced temperature control of the second working fluid 36 entering the intercooler 12, as well as enhanced temperature control of the second working fluid 36 entering the feed heater 57 of the first-effect vessel 50.

Further, a blend valve 110 may also be included and controlled by the controller 91 to assist in controlling temperature of the second working fluid 36. For example, the blend valve 110 in the illustrated embodiment is located between the feed heater 57 of the last-effect vessel 54 and the cooler 98. The blend valve 110 may be opened (e.g., via instructions from the controller 91) upon receiving temperature measurements from one or more temperature sensors (e.g., temperature sensor(s) 92 and/or 102) to route a portion of the second working fluid 36 exiting the feed heater 57 of the last-effect vessel 54 past the cooler 98 and back to the main path of the second working fluid 36. The blend valve 110 may be opened if the second working fluid 36 entering the intercooler 12 is too cold, because a portion of the second working fluid 36 would bypass the cooler 98, such that the cooler 98 does not extract heat from that portion of the second working fluid 36. In some embodiments, the portion of the second working fluid 36 flowing through the blend valve 110 may be the entirety of the second working fluid 36 flow, such that the cooler 98 is not utilized during certain times of operation. Additionally, the blend valve 110 may include a varying amount of restrictiveness. In other words, at a first time of operation, the blend valve 110 may receive instructions from the controller 91 based on a first reading from the temperature sensor 102, such that the blend valve 110 opens to a first setting to provide second working fluid 36 to the intercooler 12 at a desired temperature. At a second time of operation, the blend valve 110 may receive instructions from the controller 91 based on a second reading from the temperature sensor 102, such that the blend valve 110 opens to a second setting to provide the second working fluid 36 to the intercooler 12 at the desired temperature.

Further still, multiple other blend valves 83 may be included in the main path of the second working fluid 36. For example, as shown, the main path of the second working fluid 36 may include one blend valve 83 upstream of each of the feed heaters 57. Each of the blend valves 83 is communicatively coupled with the controller 91. Further, each of the blend valves 83 may include a temperature sensing component, or separate temperature sensors (e.g., coupled to the controller 91 and similar to temperature sensors 87, 92, and 102) may be included to take temperature measurements of the second working fluid 36 proximate to each of the blend valves 83. Based on temperature measurement feedback, the controller 91 may widen or narrow the respective flow path of one or more of the blend valves 83 to facilitate temperature control of the second working fluid 36 entering each feed heater 57, and/or to facilitate temperature control of the second working fluid 36 as it is returned to the intercooler 12. In some embodiments, the controller 91 may fully open one of the blend valves 83 such that the second working fluid 36 fully bypasses certain of the feed heaters 57. Accordingly, each of the feed heaters 57 preheats the mixture 56 prior to the mixture 56 entering the corresponding vessel 50, 52, 54, unless the second working fluid 36 does not include adequate heat, in which case the controller 91 may instruct one of the blend valves 83 to fully open to enable bypassing of the second working fluid 36. Portions of the second working fluid 36 that bypass one or more of the feed heaters 57 are routed back to the main path of the second working fluid 36 downstream of the feed heaters 57 and toward the cooler 98 (or the blend valve 110, as described above, which bypasses the cooler 98 and directs the second working fluid 36 toward the intercooler 12).

Focusing on the multi-effect distillation system 48 portion of the integrated system 88, the vessels (e.g., the first-effect vessel 50, the intermediate effect vessel(s) 52, and the last-effect vessel 54) may operate in the same way as that of the embodiment of the multi-effect distillation system 48 described with reference to FIG. 2. Once the distillate steam 60 exits the last-effect vessel 54 and enters into the condenser 70, the distillate steam 60 may be cooled and condensed via the mixture 56 that is pumped to the coils 73 via the mixture pump 111. In order to draw the distillate steam 60 toward the coils 73 of the condenser 70, an air or gas ejector 112 may be attached to the condenser 70 to maintain vacuum within the condenser 70. The air or gas ejector 112 may displace air, gas, or other non-condensable fluid within the condenser 70 as the distillate steam 60 enters the condenser 70, such that the distillate steam 60 is urged toward the coils 73 of the condenser 70 where the act of condensation of the distillate steam 60 creates the vacuum.

In summation, embodiments of the present disclosure are directed toward the integrated gas turbine engine 10, the intercooler 12, the HRSG 31, the steam turbine 35, and the multi-effect distillation system 48. The second working fluid 36 of the intercooler 12 is configured to extract heat from the compressed air 32 of the gas turbine engine 10 and provide heat (e.g., lose heat) to the mixture 56 in the feed heaters 57 of the first-effect vessel 50, the intermediate effect vessel(s) 52, and/or the last-effect vessel 54, such that the mixture 56 is preheated prior to delivering the mixture 56 to each of the heat exchange portions 49 of the vessel(s) 50, 52, 54. The working fluid 33 is configured to extract heat from the exhaust 30 of the gas turbine engine 10, lose some energy to the steam turbine 35 (which in turn drives the load 21), and provide heat (e.g., lose heat) to the mixture 56 in the heat exchange portion 49 of the first-effect vessel 50. Further, in certain embodiments, various valves (e.g., the control valve 90, the blend valve 110, the other blend valves 83, the warm up valve 107, and the bypass valve 104) may be included and configured to work in conjunction with various temperature sensors (e.g., temperature sensors 92, temperature sensor 87, and temperature sensor 102) to enable temperature control of the working fluid 33 and/or the second working fluid 36. The valves and their associated temperature sensors (e.g., control elements) may generally enable manipulation of flow rate, temperature, and/or state of the working fluid 33 and the second working fluid 36 at any point in the corresponding cycles (e.g., paths) of the working fluid 33 and the second working fluid 36. Thus, temperature of the working fluid 33 and the second working fluid 36 may be regulated via the control elements at an inlet and/or outlet of the intercooler 12, the first-effect vessel 50, the feed heaters 57, the cooler 98, the HRSG 31, the steam turbine 35, or any other point along the paths of the working fluid 33 and the second working fluid 36. Further, the control elements enable operation of the integrated gas turbine engine 10 and multi-effect distillation system 48 in varying ambient conditions, because flow rates of the working fluid 33 and the second working fluid 36 may be manipulated via the control elements to manipulate temperature, as set forth above. Further, additional heat exchangers (e.g., the feed heaters 57 and the cooler 98) are included to enable temperature control of the working fluid 33 and the second working fluid 36. In some embodiments, the temperature of the mixture 56 entering the first-effect vessel 50, the intermediate effect vessel(s) 52, and/or the last-effect vessel 54 of the multi-effect distillation system 48 may also be controlled via additional heat exchangers. Further still, due to cost savings of recycling heat of the working fluid 33 and the second working fluid 36, cost may be allocated in other areas for improved operation of the gas turbine engine 10 and/or the multi-effect distillation system 48. For example, cost may be allocated for utilizing water injection into the gas turbine engine 10 for $NO_x$ control, rather than having to use a dry emissions control type of engine or produce said injection water by other means.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gas turbine system comprising a heat recovery steam generator (HRSG), a steam turbine, a compressor, and an intercooler, wherein the HRSG is configured to receive an exhaust gas, heat a first working fluid with the exhaust gas, and route the first working fluid to the steam turbine, wherein the steam turbine is configured to extract energy from the first working fluid, and wherein the intercooler is configured to receive a compressed air from the compressor and to cool the compressed air to a first controllable temperature determined by engine controls with a second working fluid having a second controllable temperature suitable for cooling the compressed air to the first controllable temperature determined by the engine controls;
a first feed heater of a distillation system, wherein the first feed heater is configured to receive a mixture and to receive the second working fluid, such that the second working fluid sinks heat to the mixture; and
a first-effect vessel of the distillation system, wherein the first-effect vessel is configured to receive the mixture from the first feed heater and to receive the first working fluid from the steam turbine, such that the first working fluid sinks heat to the mixture and is condensed.

2. The system of claim 1, wherein the gas turbine system comprises a first compressor stage and a second compressor stage, wherein the compressed air is delivered from the first compressor stage to the intercooler, and from the intercooler to the second compressor stage, such that the compressed air is returned to the second compressor stage at the first controllable temperature determined by the engine controls.

3. The system of claim 1, wherein the distillation system comprises a multi-effect distillation system, wherein the multi-effect distillation system comprises:
the first-effect vessel and the first feed heater; and
a second-effect vessel and a second feed heater disposed upstream of the second-effect vessel, wherein the second working fluid is routed from the first feed heater upstream of the first-effect vessel to the second feed heater upstream of the second-effect vessel, and wherein at least a portion of the mixture is routed from the first-effect vessel to the second feed heater upstream of the second-effect vessel, such that the second working fluid sinks heat to the portion of the mixture in the second feed heater.

4. The system of claim 3, wherein a distillate is boiled off the mixture in the first-effect vessel as a vapor, and wherein the vapor distillate sinks heat to the portion of the mixture in the second-effect vessel after the portion of the mixture passes through the second feed heater upstream of the additional vessel.

5. The system of claim 3, comprising:
a first blend valve disposed upstream of the first feed heater; and
a second blend valve disposed upstream of the second feed heater, wherein the first blend valve and the second blend valve are configured to enable bypass of the first feed heater and the second feed heater, respectively, for at least a portion of the second working fluid such that the second controllable temperature of the second working fluid returning to the intercooler is controllable.

6. The system of claim 3, comprising a cooler disposed downstream of the second feed heater and configured to receive the second working fluid and a cooling agent, such that the cooling agent cools the second working fluid prior to delivery of the second working fluid back to the intercooler, thereby facilitating control of the second controllable temperature of the second working fluid.

7. The system of claim 6, comprising:
a blend valve disposed between the second feed heater and the cooler, wherein the blend valve is configured to enable bypass of the cooler for at least a portion of the second working fluid prior to deliver of the second working fluid back to the intercooler, thereby facilitating control of the second controllable temperature of the second working fluid.

8. The system of claim 6, comprising:
a bypass valve configured to enable total bypass of the first feed heater and the second feed heater of the multi-effect distillation system for the second working fluid such that the second working fluid, when the bypass valve is activated, is routed from the intercooler, to the cooler, and back to the intercooler, thereby facilitating control of the second controllable temperature of the second working fluid; and
a warm up valve configured to enable total bypass of the feed heater, the additional feed heater, and the cooler such that the second working fluid, when the warm up valve is activated, is routed from the intercooler back to the intercooler.

9. The system of claim 3, comprising a control system having one or more temperature and/or flow sensors, one or more valves, and a controller communicatively coupled with the one or more temperature and/or flow sensors and the one or more valves, wherein the controller is configured to receive signals indicative of controllable temperatures of the first working fluid, the second working fluid, or both from the temperature and/or flow sensors, wherein the controller is configured to analyze the signals, and wherein the controller is configured to control the one or more valves to enable blending and/or bypassing of components of the multi-effect distillation system for the first working fluid, the second working fluid, or both, based at least in part on the controllable temperatures of the first working fluid, the second working fluid, or both.

10. The system of claim 1, comprising:
a bypass valve configured to enable the first working fluid to bypass the first-effect vessel of the distillation system such that the first working fluid is cycled to and from the HRSG without passing through the vessel of the distillation system, thereby facilitating control of a third controllable temperature and a controllable state of the first working fluid; and
a heat sink configured to receive the first working fluid only if the bypass valve enables the first working fluid to bypass the first-effect vessel of the distillation system, thereby facilitating control of the third controllable temperature and a controllable state of the first working fluid.

11. A system, comprising:
a controller configured to:
regulate at least one valve to control a first controllable flow and/or a first controllable temperature of an intercooler working fluid through an intercooler of a gas turbine engine and through a feed heater of a distillation system, such that the first controllable temperature of the intercooler working fluid is suitable for cooling a compressed air routed from a compressor of the gas turbine engine to the intercooler of the gas turbine engine to a second controllable temperature determined by the controller, and such that the first controllable temperature of the intercooler working fluid is suitable for preheating a mixture in the feed heater of the distillation system; and
regulate the at least one valve to control a second controllable flow and a third controllable temperature of a steam exhaust working fluid through a heat recovery generator (HRSG) and a steam turbine of a gas turbine engine, and through an effect vessel of the distillation system, wherein the effect vessel is disposed downstream of, and in fluid communication with, the feed heater of the distillation system, such that the effect vessel receives the mixture from the feed heater and such that the steam exhaust working fluid sinks heat to the mixture in the effect vessel.

12. The system of claim 11, comprising:
the at least one valve and the effect vessel of the distillation system, wherein the at least one valve comprises a bypass valve configured to, when set by the controller to a first setting, temporarily isolate the steam exhaust working fluid from flowing to the effect vessel of the distillation system and, when set by the controller to a second setting, enable the steam exhaust working fluid to flow to the effect vessel of the distillation system.

13. The system of claim 11, comprising:
the at least one valve, wherein the at least one valve comprises a bypass valve configured to, when set by the controller to a first setting, temporarily isolate the intercooler working fluid from flowing to the feed heater of the distillation system and, when set by the controller to a second setting, enable the intercooler working fluid to flow to the feed heater of the distillation system.

14. The system of claim 11, comprising at least one pump configured to, when controlled by the control, regulate the first and/or the second flow of the intercooler working fluid and/or the steam exhaust working fluid, respectively, thereby enabling control of the first controllable temperature and/or the third controllable temperature of the intercooler working fluid and/or the steam exhaust working fluid, respectively.

15. The system of claim 11, comprising a heat exchanger that receives the steam exhaust working fluid, wherein the controller is configured to activate or deactivate the heat exchanger to enable or disable, respectively, cooling of the steam exhaust working fluid.

16. A method, comprising:
flowing an intercooler working fluid through an intercooler of a gas turbine engine;
sinking heat from a compressed air of a compressor of the gas turbine engine to the intercooler working fluid within the intercooler;
flowing the intercooler working fluid from the intercooler to a first feed heater of a multi-effect distillation system;
sinking heat from the intercooler working fluid to a mixture within the first feed heater of the multi-effect distillation system;
heating the mixture within a first-effect vessel of the multi-effect distillation system with a steam exhaust working fluid, wherein the first-effect vessel is disposed downstream from, and in fluid communication with, the first feed heater such that the first-effect vessel receives the mixture from the first feed heater;
controlling, based on input from controls of the gas turbine engine, a first temperature of the compressed air by controlling a second temperature of the intercooler working fluid;
flowing the steam exhaust working fluid through a heat recovery steam generator (HRSG) of the gas turbine engine;
heating the steam exhaust working fluid within the HRSG via an exhaust gas of the gas turbine engine; and
flowing the steam exhaust working fluid from the HRSG, through a steam turbine, and to the multi-effect distillation system.

17. The method of claim 16, wherein controlling, based on input from the controls of the gas turbine engine, the second temperature of the intercooler working fluid comprises actively opening and/or closing, at least in part, of at least one valve receiving a flow of the intercooler working fluid.

18. The method of claim 16, wherein controlling, based on input from the controls of the gas turbine engine, the second temperature of the working fluid comprises causing the intercooler working fluid to temporarily bypass the multi-effect distillation system.

19. The method of claim 16, wherein controlling, based on input from the controls of the gas turbine engine, the second temperature of the intercooler working fluid comprises actively controlling a pump that receives a flow of the intercooler working fluid.

* * * * *